United States Patent
Kojima et al.

(10) Patent No.: US 10,125,283 B2
(45) Date of Patent: Nov. 13, 2018

(54) INK, INK CARTRIDGE, AND INK JET RECORDING METHOD

(71) Applicant: CANON KABUSHIKI KAISHA, Tokyo (JP)

(72) Inventors: Yojiro Kojima, Tokyo (JP); Yuko Negishi, Tama (JP); Yoshihisa Yamashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/364,374

(22) Filed: Nov. 30, 2016

(65) Prior Publication Data

US 2017/0183527 A1 Jun. 29, 2017

(30) Foreign Application Priority Data

Dec. 28, 2015 (JP) .................. 2015-255629

(51) Int. Cl.
| | |
|---|---|
| *B41J 2/01* | (2006.01) |
| *C09D 11/38* | (2014.01) |
| *C09D 11/033* | (2014.01) |
| *C09D 11/322* | (2014.01) |
| *C09D 11/324* | (2014.01) |

(52) U.S. Cl.
CPC .............. *C09D 11/38* (2013.01); *B41J 2/01* (2013.01); *C09D 11/033* (2013.01); *C09D 11/322* (2013.01); *C09D 11/324* (2013.01)

(58) Field of Classification Search
None
See application file for complete search history.

(56) References Cited

U.S. PATENT DOCUMENTS

| | | |
|---|---|---|
| 6,203,604 B1 | 3/2001 | Kashiwazaki et al. |
| 6,248,482 B1 | 6/2001 | Kashiwazaki et al. |
| 6,852,156 B2 | 2/2005 | Yeh et al. |
| 6,921,433 B2 | 7/2005 | Kuribayashi et al. |
| 6,964,700 B2 | 11/2005 | Uji et al. |
| 7,566,362 B2 | 7/2009 | Mori et al. |
| 7,615,113 B2 | 11/2009 | Aikawa et al. |

(Continued)

FOREIGN PATENT DOCUMENTS

| | | |
|---|---|---|
| JP | 2003-535949 A | 12/2003 |
| JP | 2008-144033 A | 6/2008 |

(Continued)

*Primary Examiner* — Erica Lin
(74) *Attorney, Agent, or Firm* — Fitzpatrick, Cella, Harper & Scinto

(57) ABSTRACT

An aqueous ink containing a self-dispersible pigment for use in an ink jet recording method using a recording head that ejects an ink by an action of thermal energy. The aqueous ink contains a compound represented by General Formula (I):

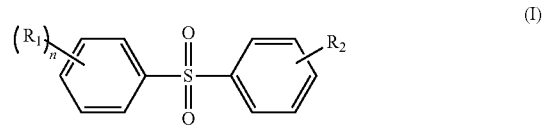

where in General Formula (I) $R_1$'s are independently of each other, a sulfonic acid group, a carboxylic acid group, a phosphoric acid group or a phosphonic acid group, $R_2$ is a hydrogen atom or an alkyl group, and n is an integer of 1 to 5.

12 Claims, 2 Drawing Sheets

(56) References Cited

U.S. PATENT DOCUMENTS

| | | |
|---|---|---|
| 7,909,449 B2 | 3/2011 | Sato et al. |
| 8,011,777 B2 | 9/2011 | Yamashita et al. |
| 8,764,178 B2 | 7/2014 | Tamanuki et al. |
| 8,992,674 B2 | 3/2015 | Ikegami et al. |
| 2002/0014184 A1 | 2/2002 | Yeh et al. |
| 2004/0227798 A1* | 11/2004 | Nakajima ............ C09D 11/101 347/100 |
| 2009/0104414 A1* | 4/2009 | Furuta .................. C08G 73/106 428/195.1 |
| 2010/0006221 A1* | 1/2010 | Janke .................... C08G 18/12 156/322 |
| 2010/0034972 A1 | 2/2010 | Mukae et al. |
| 2011/0104619 A1* | 5/2011 | Fujii .................... B41M 5/3336 430/467 |
| 2012/0268536 A1* | 10/2012 | Saito .................... C09D 11/322 347/96 |
| 2016/0280945 A1 | 9/2016 | Mukae et al. |

FOREIGN PATENT DOCUMENTS

| | | |
|---|---|---|
| WO | 01/02351 A2 | 1/2001 |
| WO | 01/94476 A2 | 12/2001 |

\* cited by examiner

INK, INK CARTRIDGE, AND INK JET RECORDING METHOD

BACKGROUND OF THE INVENTION

Field of the Invention

The present invention relates to an ink, an ink cartridge, and an ink jet recording method.

Description of the Related Art

The recording speed of ink jet recording apparatuses has been dramatically improved as a result of the technical advance. Such ink jet recording apparatuses have been gradually introduced into the field of business document printing in place of laser recording apparatuses. Ink jet recording apparatuses typically use, as inks for texts to be used for recording images on recording media such as plain paper, aqueous inks containing self-dispersible pigments as a coloring material in consideration of high optical density.

A recording head employing the system of ejecting an ink by the action of thermal energy has a large number of ejection orifices and thus is useful in terms of recording speed and the like. In the field of business document printing, the recording frequency and the recording amount are large, and thus the occurrence of kogation is required to be reduced at a higher level than ever before in the ejection system using thermal energy. For more stable ejection by the ink jet method, an ink containing a vinyl dispersion resin having a phenylsulfonylphenyl structure has been disclosed, for example (Japanese Patent Application Laid-Open No. 2008-144033).

However, the results of studies by the inventors of the present invention have shown that various additives that have been thought to be effective are not always effective for the aqueous ink containing a self-dispersible pigment as a coloring material when the ink is applied to the system of ejecting an ink by the action of thermal energy.

An object of the present invention is thus to provide an aqueous ink that contains a self-dispersible pigment as a coloring material but reduces the occurrence of kogation and enables the recording of high quality images when the ink is used in the ink jet recording method using a recording head that ejects an ink by the action of thermal energy. The present invention is also directed to provide an ink cartridge including the aqueous ink and an ink jet recording method using the aqueous ink.

SUMMARY OF THE INVENTION

The above object is achieved by the following present invention. In other words, the present invention provides an aqueous ink containing a self-dispersible pigment for use in an ink jet recording method using a recording head that ejects an ink by an action of thermal energy, the aqueous ink including a compound represented by General Formula (I).

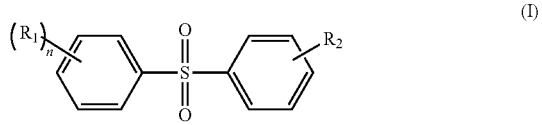

(I)

(In General Formula (I), $R_1$'s are independently of each other, a sulfonic acid group, a carboxylic acid group, a phosphoric acid group, or a phosphonic acid group, $R_2$ is a hydrogen atom or an alkyl group, and n is an integer of 1 to 5)

The present invention can provide an aqueous ink that contains a self-dispersible pigment as a coloring material but reduces the occurrence of kogation and enables the recording of high quality images when the ink is used in the ink jet recording method using a recording head that ejects an ink by the action of thermal energy. The present invention can also provide an ink cartridge including the aqueous ink and an ink jet recording method using the aqueous ink.

Further features of the present invention will become apparent from the following description of exemplary embodiments with reference to the attached drawings.

BRIEF DESCRIPTION OF THE DRAWINGS

FIG. 2A is a perspective view of a principal part of the ink jet recording apparatus; and FIG. 2B is a perspective view of a head cartridge.

DESCRIPTION OF THE EMBODIMENTS

Figure 1:
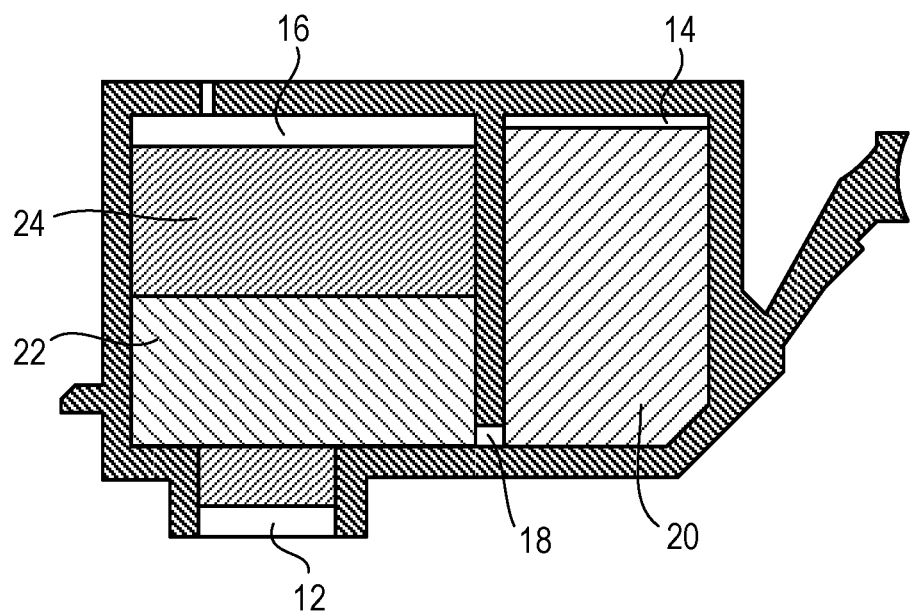
FIG. 1 is a schematic sectional view illustrating an embodiment of an ink cartridge of the present invention.

Preferred embodiments of the present invention will now be described in detail in accordance with the accompanying drawings.

Embodiments of the present invention will now be described, but the present invention is not intended to be limited to the following embodiments. In the present invention, salts or anionic groups in a salt form can dissociate into ions in an ink, but are expressed as "salts" or "anionic groups" for convenience. A self-dispersible pigment and an aqueous ink for ink jet may also be simply called "pigment" and "ink". Various physical property values in the present specification are the values determined at normal temperature (25° C.) unless otherwise noted. The ink of the present invention is an aqueous ink, and thus the unit "mmol/kg" in the present invention is calculated where the ink has a specific gravity of "1 g/mL".

The inventors of the present invention have found that when an ink contains a self-dispersible pigment as a coloring material but containing a compound represented by General Formula (I) reduces the occurrence of kogation. The inventors of the present invention suppose that such an effect can be achieved by the following mechanism.

When a recording head ejecting an ink by using thermal energy is used and the thermal energy is applied to a heater, the heat may denature or oxidize components such as a pigment. Substances obtained by such denaturation, oxidation, or the like adhere onto the heater to generate kogation. To reduce the occurrence of kogation, measures to reduce the thermal action or oxidation have been studied, for example. As one of such measures, a technique of using a resin-dispersed pigment as a coloring material has been used. When the resin-dispersed pigment is used, images are likely to have poor optical density unfortunately.

Hence, the inventors of the present invention have studied a technique of capable of reducing the occurrence of kogation when a self-dispersible pigment contained in the ink as a coloring material. As a result, the inventors have found that by adding a compound represented by General Formula (I) into an ink, the thermal action to the pigment and the oxidation of the pigment are reduced, and the occurrence of kogation is reduced.

The compound represented by General Formula (I) has benzene rings at both sides of the sulfonyl group. In addition, one benzene ring is substituted with an anionic group, and the other benzene ring is unsubstituted or substituted with an alkyl group. Thus, the benzene ring substituted with an anionic group has high hydrophilicity, and the other benzene ring has low hydrophilicity. In other words, in the compound represented by General Formula (I), the benzene rings positioned at both sides of the sulfonyl group differ greatly in hydrophilicity. The compound represented by General Formula (I) accordingly has affinity both to a hydrophobic area of the self-dispersible pigment and to a hydrophilic area of the anionic group of the self-dispersible pigment, and thus can be present in the vicinity of the self-dispersible pigment. The compound represented by General Formula (I) is thus supposed to reduce the thermal action to the self-dispersible pigment and to reduce the occurrence of kogation. In addition, the aromatic sulfonyl group of the compound represented by General Formula (I) exhibits the action of trapping radicals due to resonance stabilization. This is supposed to enable the reduction of the oxidation of the self-dispersible pigment and the reduction of the occurrence of kogation.

As described above, the ink of the present invention is an ink including a self-dispersible pigment as a coloring material and thus can meet the demand for excellent optical density that is required for business documents and the like but is difficult to achieve by the ink including a dye or a resin-dispersed pigment. In addition, the ink of the present invention is an ink including a particular component and thus can effectively reduce the occurrence of kogation.

Aqueous Ink

The aqueous ink of the present invention is an aqueous ink for ink jet containing a self-dispersible pigment and a compound represented by General Formula (I) for use in an ink jet recording method using a recording head that ejects an ink by the action of thermal energy. The ink of the present invention is not necessarily what is called "curable ink". Thus, the ink does not necessarily contain a compound that is polymerizable by application of external energy, such as a polymerizable monomer. Components constituting the ink of the present invention, physical properties of the ink, and the like will next be described in detail.

Self-Dispersible Pigment

The self-dispersible pigment contained in the ink of the present invention has a functional group that is bonded to the particle surface of the pigment. More specifically, an anionic group is bonded to the pigment particle surface directly or through another atomic group.

Functional Group

The functional group bonded to the pigment particle surface is an anionic group or a group constituted by combining another atomic group with an anionic group. Examples of the anionic group include a carboxylic acid group, a sulfonic acid group, a phosphoric acid group, and a phosphonic acid group. Such an anionic group may form a salt. When an anionic group forms a salt, at least one of the protons on the group is replaced by a cation. Examples of the cation include an alkali metal ion, an ammonium ion, and an organic ammonium ion. Examples of the alkali metal ion include ions such as a lithium ion, a sodium ion, and a potassium ion. Examples of the organic ammonium ion include cations of aliphatic amines such as mono- to tri-alkylamines; cations of aliphatic alcohol amines such as mono- to tri-alkanolamines; and salts thereof. The anionic group is particularly preferably in the form of an alkali metal salt such as a sodium salt and a potassium salt or in an ammonium salt form.

Examples of said another atomic group include alkylene groups such as a methylene group, an ethylene group, and a propylene group; arylene groups such as a phenylene group, a naphthylene group, an anthracenylene group, a phenanthrenylene group, and a biphenylene group; heteroarylene groups such as a pyridylene group, an imidazolylene group, a pyrazolylene group, a pyridinylene group, a thienylene group, and a thiazolylene group; a carbonyl group; ester groups such as a carboxylate ester group, a sulfonate ester group, a phosphate ester group, and a phosphonate ester group; an imino group; an amido group; a sulfonyl group; and an ether group. Said another atomic group may be a combination group of them. As compared with a self-dispersible pigment having an anionic group bonded directly to the pigment particle surface, a self-dispersible pigment having an anionic group bonded to the pigment particle surface through another atomic group is preferably used. The pigment particle surface has various conditions, and accordingly the anionic group directly bonded to the particle surface has various conditions. Thus, the anionic group susceptible to oxidation is likely to be formed. On this account, the self-dispersible pigment having an anionic group directly bonded to the pigment particle surface may consequently become a self-dispersible pigment susceptible to oxidation. This is the reason for the above-mentioned preferable use. In addition, the self-dispersible pigment having an anionic group bonded to the pigment particle surface through another atomic group has an advantage of capable of further improving the optical density of an image to be recorded and thus is preferably used.

The self-dispersible pigment is preferably a self-dispersible pigment having an anionic group that is bonded to the pigment particle surface through another atomic group. Specifically, the functional group bonded to the pigment particle surface is particularly preferably a phthalic acid group.

Pigment Species and Physical Property Values

As for the pigment constituting the self-dispersible pigment (pigment species), for example, an inorganic pigment such as carbon black, calcium carbonate and titanium oxide, or an organic pigment such as azo, phthalocyanine and quinacridone may be used. Among these, carbon black or the organic pigment is favorably used, and carbon black is particularly favorably used as the pigment because it has more reaction active points on its particle surface than other pigments, and so the introduced amount of the functional group is easy to be increased. As carbon black, any carbon black such as furnace black, lamp black, acetylene black and channel black may be used.

The DBP oil absorption of carbon black is favorably 50 ml/100 g or more and 200 ml/100 g or less, more favorably 120 ml/100 g or more and 170 ml/100 g or less, particularly favorably 120 ml/100 g or more and 150 ml/100 g or less. The DBP oil absorption can be measured by a method conforming to JIS K 6221 or ASTM D 2414. These methods are those in which dibutyl phthalate is added dropwise to 100 g of carbon black under agitation, and then the amount of dibutyl phthalate added is measured at the point of time of the maximum torque.

The specific surface area of carbon black according to the BET method is favorably 100 $m^2/g$ or more and 600 $m^2/g$ or less. The specific surface area according to the BET method can be measured by a method conforming to JIS K 6217 or ASTM D 6556. These methods are those in which deaerated carbon black is immersed in liquid nitrogen, and then the amount of nitrogen adsorbed on a particle surface of carbon black is measured when having reached the equilibrium.

The primary particle size of carbon black is favorably 10 nm or more and 40 nm or less. Carbon black is generally present in such a state that plural primary particles sterically extend like a bunch of grapes. The primary particle size means a particle size of carbon black (primary particle) of the smallest unit forming one pigment particle. The primary particle size of carbon black can be determined by observing and measuring the particle size of carbon black of the smallest unit forming the pigment particle at about 100 points through a transmission or scanning type electron microscope and calculating the arithmetical mean thereof.

The average particle size of carbon black is favorably 50 nm or more and 200 nm or less. The average particle size means a particle size of carbon black as an ordinarily existing form. In the present invention, the average particle size can be measured as a 50% cumulative value [$D_{50}$ (nm)] in a volume-based particle size distribution by using a dynamic light scattering type particle size distribution measuring device or the like.

The primary particle size of the organic pigment is favorably 50 nm or more and 150 nm or less. In addition, the average particle size of the organic pigment is favorably 50 nm or more and 250 nm or less. The definitions of the primary particle size and average particle size of the organic pigment are the same as the definitions of the primary particle size and average particle size of carbon black, respectively.

When a pigment has an excessively large or excessively small particle diameter, the measurement of surface charge amount by colloidal titration may be affected by the particle diameter. In order to improve the measurement accuracy and to achieve a high level of ejecting performance as an ink for ink jet, the pigment preferably has an average particle diameter ($D_{50}$) of 60 nm or more to 120 nm or less. The pigment preferably has a $D_{90}$ (90% cumulative value in the particle size distribution in terms of volume) of 100 nm or more to 300 nm or less.

Content

In the ink, the content (% by mass) of the self-dispersible pigment is preferably 0.10% by mass or more to 15.00% by mass or less and more preferably 1.00% by mass or more to 10.00% by mass or less based on the total mass of the ink.

Production Method of Self-Dispersible Pigment

The production method of a self-dispersible pigment is roughly classified into an oxidation type and a surface-modification type. The self-dispersible pigment used in the aqueous ink of the present invention may be produced by any method.

The oxidation type production method of a self-dispersible pigment can be exemplified by a method of oxidizing a pigment with an oxidant such as hypochlorous acid; a method of oxidizing a pigment with ozone in water; and a method of oxidizing a pigment with an oxidant after ozone treatment. The surface-modification type production method of a self-dispersible pigment can be exemplified by a method of chemically treating a pigment with a compound capable of generating a diazonium salt, a diazene compound, a substituted triazine compound, or a compound having an anionic group as a treatment agent. Examples of the compound having an anionic group to be used as a treatment agent include the compounds represented by General Formulae (1), (2), and (3). When a self-dispersible pigment is produced by oxidation, a functional group susceptible to oxidation, such as aldehyde and ketone, is likely to be formed during the oxidation of the pigment particle surface. On this account, a self-dispersible pigment produced by the surface-modification type production method is preferably used. In particular, this method enables efficient production of a self-dispersible pigment that has an anionic group bonded to the pigment particle surface through another atomic group and thus is preferred.

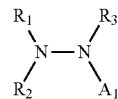

(1)

(In General Formula (1), $R_1$, $R_2$ and $R_3$ are, independently of one another, a hydrogen atom, a group having at least one of an aliphatic group and an aromatic group, a carboxylate ester group or —S(=O)$_2$—R$_4$, with the proviso that $R_1$, $R_2$ and $R_3$ are not hydrogen atoms at the same time, $R_4$ is a hydroxy group or a group having at least one of an aliphatic group and an aromatic group, and $A_1$ is selected from the group consisting of a carboxylic acid group, a sulfonic acid group, a phosphoric acid group, a phosphonic acid group and a group having at least one of an aliphatic group and an aromatic group and being substituted with at least one hydrophilic group selected from the group consisting of a carboxylic acid group, a sulfonic acid group, a phosphoric acid group, and a phosphonic acid group)

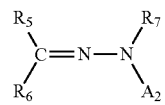

(2)

(In General Formula (2), $R_5$ and $R_6$ are, independently of each other, a hydrogen atom, a group having at least one of an aliphatic group and an aromatic group, a halogen atom, a cyano group, a nitro group, an amino group, an alkoxy group, a thioalkoxy group, an acyl group, a carboxylate ester group, an aryloxy group, a carboxylic acid group, a sulfonic acid group, a phosphoric acid group or a phosphonic acid group, with the proviso that $R_5$ and $R_6$ are not hydrogen atoms at the same time, $R_7$ is a hydrogen atom, a group having at least one of an aliphatic group and an aromatic group or a carboxylate ester group, and $A_2$ is selected from the group consisting of a carboxylic acid group, a sulfonic acid group, a phosphoric acid group, a phosphonic acid group and a group having at least one of an aliphatic group and an aromatic group and being substituted with at least one hydrophilic group selected from the group consisting of a carboxylic acid group, a sulfonic acid group, a phosphoric acid group, and a phosphonic acid group)

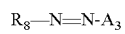

(3)

(In General Formula (3), $R_8$ is a cyano group or an atomic group having (i) at least one group selected from the group consisting of an ester group, an ether group, a thioether group, a ketone group and a sulfonyl group, and (ii) a group having at least one of an aliphatic group and an aromatic group, and $A_3$ represents a group having at least one of an aliphatic group and an aromatic group and being substituted with at least one hydrophilic group selected from the group consisting of a carboxylic acid group, a sulfonic acid group, a phosphoric acid group, and a phosphonic acid group)

In General Formulae (1), (2), and (3), the aliphatic group can be exemplified by an alkyl group, an alkenyl group, and an alkynyl group. The alkyl group, the alkenyl group, and the alkynyl group may be any of a linear group, a branched group, and a cyclic group. The straight or branched alkyl group, alkenyl group, or alkynyl group preferably has a carbon number of about 1 to 12. The cyclic alkyl group, alkenyl group, or alkynyl group may be either a monocyclic group or a polycyclic group, and the number of elements constituting the ring is preferably about 3 to 8. Examples of the aliphatic group include linear saturated alkyl groups such as a methyl group, an ethyl group, a propyl group, a butyl group, a pentyl group, and a hexyl group; branched saturated alkyl groups such as an isopropyl group, an isobutyl group, and a 2-ethylhexyl group; alkenyl groups such as an ethenyl group, a propenyl group, and a butenyl group; alkynyl groups such as an ethynyl group, a propynyl group, and a butynyl group; and alicyclic groups such as a cyclopropyl group, a cyclobutyl group, a cyclopentyl group, and a cyclohexyl group. The aliphatic group may have a substituent including a halogen atom such as a fluorine atom, a chlorine atom, and a bromine atom and a hydroxy group.

In General Formulae (1), (2), and (3), the aromatic group can be exemplified by an aryl group and a heteroaryl group. The aryl group and the heteroaryl group may be either a monocyclic group or a polycyclic group, and the number of elements constituting the ring is preferably about 3 to 8. Examples of the aryl group include a phenyl group, a naphthyl group, an anthracenyl group, a phenanthrenyl group, and a biphenyl group. Examples of the heteroaryl group include a pyridyl group, an imidazolyl group, a pyrazolyl group, a pyridinyl group, a thienyl group, and a thiazolyl group. Of them, a phenyl group, a naphthyl group, an anthracenyl group, a phenanthrenyl group, a biphenyl group, and a pyridinyl group are preferred, and a phenyl group and a naphthyl group are more preferred, for example.

In General Formulae (1), (2), and (3), the group having an aliphatic group and an aromatic group can be exemplified by a group having such groups as exemplified in the above directly with each other or through a typical linker structure such as —O—, —NH—, —CO—, —COO—, —CONH—, —N=N—, —SO— and —SO$_2$—. In order to increase the hydrophilicity of a functional group, the group having an aliphatic group and an aromatic group preferably has a linker structure.

In General Formulae (1) and (2), the carboxylate ester group is a group in which an aliphatic group as exemplified in the above is bonded to an ester linkage —C(=O)—O—. Examples of the carboxylate ester group include a methoxycarbonyl group, an ethoxycarbonyl group, an n-propoxycarbonyl group, an i-propoxycarbonyl group, an n-butoxycarbonyl group, and a t-butoxycarbonyl group. A carboxylate ester group may undergo ester hydrolysis during a reaction to give a corresponding hydrophilic group (optionally giving a salt or an anhydride). The ester hydrolysis is likely to be caused when heating or stirring is performed in the presence of an acid or an alkali.

Of $R_5$ and $R_6$ in General Formula (2), the halogen atom, the alkoxy group, the thioalkoxy group, the acyl group, and the aryloxy group will be described. Examples of the halogen atom include a fluorine atom, a chlorine atom, and a bromine atom. The alkoxy group is a group in which an aliphatic group as exemplified in the above is bonded to an ether bond (—O—). Examples of the alkoxy group include a methoxy group, an ethoxy group, an n-propoxy group, an i-propoxy group, an n-butoxy group, and a t-butoxy group. The thioalkoxy group is a group in which an aliphatic group as exemplified in the above is bonded to a thioether bond (—S—). Examples of the thioalkoxy group include a thiomethoxy group, a thioethoxy group, a thio-n-propoxy group, a thio-i-propoxy group, a thio-n-butoxy group, and a thio-t-butoxy group. The acyl group is a group in which an aliphatic group as exemplified in the above is bonded to a carbonyl bond (—C(=O)—). Examples of the acyl group include a formyl group, an acetyl group, an n-propionyl group, and an i-propionyl group. The aryloxy group is a group in which an aromatic group as exemplified in the above is bonded to an ether bond (—O—). Examples of the aryloxy group include a phenoxy group and a naphthoxy group.

In General Formulae (1), (2), and (3), the hydrophilic group is at least one group selected from the group consisting of a carboxylic acid group, a sulfonic acid group, a phosphoric acid group, and a phosphonic acid group. Such a hydrophilic group may be in a salt form or an anhydride form, for example, which can be present chemically. When a carboxylic acid group, a sulfonic acid group, a phosphoric acid group, and a phosphonic acid group form a salt, at least one of the protons on such a group is replaced by a cation. Examples of the cation include an alkali metal ion, an ammonium ion, and an organic ammonium ion. Examples of the alkali metal ion include ions such as a lithium ion, a sodium ion, and a potassium ion. Examples of the organic ammonium ion include cations of aliphatic amines such as mono- to tri-alkylamines; cations of aliphatic alcohol amines such as mono- to tri-alkanolamines; and salts thereof. In the aqueous ink, a salt can dissociate into ions but is expressed as "salt" for convenience.

In the compounds represented by General Formulae (1), (2), and (3), the number of hydrophilic groups as the substituent is theoretically equal to the number of hydrogen atoms present on the group having at least one of an aliphatic group and an aromatic group. For example, the number of hydrophilic groups as the substituent is 1 to 3 on a methyl group, 1 to 5 on an ethyl group, 1 to 5 on a phenyl group, 1 to 7 on a naphthyl group, 1 to 9 on an anthracenyl group, and 1 to 4 on a pyridyl group. Depending on a structure, when a single group having at least one of an aliphatic group and an aromatic group is substituted with 1 to 2 hydrophilic groups, the pigment can be self-dispersed in practice.

Surface Charge Amount

The amount of the anionic group bonded to the particle surface of a self-dispersible pigment directly or through another atomic group can be determined as the surface charge amount of the pigment. The surface charge amount can be determined by colloidal titration utilizing a potential difference. A larger value of surface charge amount indicates a larger number of the anionic groups, and a smaller value indicates a smaller number of the anionic groups. The surface charge amount of a self-dispersible pigment is represented by the amount in terms of 1 g of a solid content of the self-dispersible pigment. In the examples described later, an automatic potential-difference titrator (trade name "AT-510", manufactured by Kyoto Electronics Manufacturing) equipped with a stream potential titration unit (PCD-500) was used to determine the surface charge amount of the self-dispersible pigment in a pigment dispersion liquid by colloidal titration using a potential difference. As the titrant, methyl glycol chitosan was used. Alternatively, the self-dispersible pigment extracted from an ink by an appropriate method can be used to determine the surface charge amount.

The self-dispersible pigment preferably has a surface charge amount (mmol/g) of 0.025 mmol/g or more to 1.000 mmol/g or less. If the surface charge amount is less than 0.025 mmol/g, only a few functional groups are bonded to the pigment particle surface, and there is an excess exposed hydrophobic portion on the particle surface. On this account, the hydrophilic compound represented by General Formula (I) is unlikely to come close to the pigment particle surface, and this may reduce the heat shielding effect and the effect of reducing the oxidation caused by oxygen present in the vicinity of the particle surface. If the surface charge amount is more than 1.000 mmol/g, many functional groups are bonded to the pigment particle surface, and accordingly there are many anionic groups. On this account, the charged compound represented by General Formula (I) is unlikely to come close to the pigment particle surface, and this may reduce the heat shielding effect and the effect of reducing the oxidation caused by oxygen present in the vicinity of the particle surface.

Compound Represented by General Formula (I)

The aqueous ink of the present invention contains the compound represented by General Formula (I).

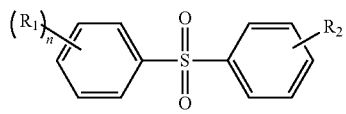

(In General Formula (I), $R_1$'s are independently of each other, a sulfonic acid group, a carboxylic acid group, a phosphoric acid group or a phosphonic acid group, $R_2$ is a hydrogen atom or an alkyl group, and n is an integer of 1 to 5)

In General Formula (I), each of the sulfonic acid group, the carboxylic acid group, the phosphoric acid group, and the phosphonic acid group represented by $R_1$ may form a salt. Examples of the salt include an alkali metal salt, an ammonium salt, and an organic ammonium salt. Examples of the alkali metal include lithium, sodium, and potassium. Examples of the organic ammonium include alkylamines having a carbon number of 1 or more to 3 or less, such as methylamine and ethylamine; and mono-, di-, or tri-alkanolamines having a carbon number of 1 or more to 4 or less, such as monoethanolamine, diethanolamine, triethanolamine, monoisopropanolamine, diisopropanolamine, and triisopropanolamine. $R_1$ of the compound represented by General Formula (I) is particularly preferably in an acid form, the form of an alkali metal salt such as a sodium salt and a potassium salt, or an ammonium salt form. n is preferably an integer of 1 to 3 and more preferably 1 or 2.

In General Formula (I), the alkyl group represented by $R_2$ preferably has a carbon number of 1 or more to 3 or less. Specific examples of the alkyl group include a methyl group, an ethyl group, an n-propyl group, and an isopropyl group. Of them, a methyl group is preferred.

Preferred examples of the compound represented by General Formula (I) include the following compounds 1 to 26, which are represented in a free acid form. In the present invention, the compound represented by General Formula (I) may be any compound that is included in the structure of General Formula (I) and the definition thereof, and is not limited to the following compounds. The compound represented by General Formula (I) is preferably the compounds 9 to 26 and more preferably the exemplified compounds 10 and 15 of the following compounds.

TABLE 1

Specific examples of compound represented by General Formula (I)

| | $R_1$ | n | $R_2$ |
|---|---|---|---|
| Compound 1 | $SO_3H$ | 1 | H |
| Compound 2 | $SO_3H$ | 2 | H |
| Compound 3 | $SO_3H$ | 3 | H |
| Compound 4 | $SO_3H$ | 4 | H |
| Compound 5 | $SO_3H$ | 1 | $CH_3$ |
| Compound 6 | $SO_3H$ | 2 | $CH_3$ |
| Compound 7 | $SO_3H$ | 3 | $CH_3$ |
| Compound 8 | $SO_3H$ | 4 | $CH_3$ |
| Compound 9 | COOH | 1 | H |
| Compound 10 | COOH | 2 | H |
| Compound 11 | COOH | 3 | H |
| Compound 12 | COOH | 4 | H |
| Compound 13 | COOH | 5 | H |
| Compound 14 | COOH | 1 | $CH_3$ |
| Compound 15 | COOH | 2 | $CH_3$ |
| Compound 16 | COOH | 3 | $CH_3$ |
| Compound 17 | COOH | 4 | $CH_3$ |
| Compound 18 | COOH | 5 | $CH_3$ |
| Compound 19 | $PO_3H_2$ | 1 | H |
| Compound 20 | $PO_3H_2$ | 2 | H |
| Compound 21 | $PO_3H_2$ | 3 | H |
| Compound 22 | $PO_3H_2$ | 4 | H |
| Compound 23 | $PO_3H_2$ | 1 | $CH_3$ |
| Compound 24 | $PO_3H_2$ | 2 | $CH_3$ |
| Compound 25 | $PO_3H_2$ | 3 | $CH_3$ |
| Compound 26 | $PO_3H_2$ | 4 | $CH_3$ |

When having high affinity with a self-dispersible pigment, the compound represented by General Formula (I) is likely to come closer to the pigment particle surface and can reduce the occurrence of kogation at a higher level. On this account, the functional group of the self-dispersible pigment preferably has an aromatic group as another atomic group. In addition, the functional group bonded to the pigment particle surface is preferably a phthalic acid group. The compound represented by General Formula (I) also has benzene rings, and thus when such a combination is adopted, the functional group of the self-dispersible pigment and the compound represented by General Formula (I) have a common structure to exhibit high affinity. In particular, the benzene ring substituted with $R_1$ in General Formula (1) preferably has the same structure as that of the functional group of the self-dispersible pigment (functional group bonded to the pigment particle surface). For example, the functional group bonded to the particle surface of the self-dispersible pigment is preferably a phthalic acid group; and in General Formula (I), $R_1$ is preferably a carboxylic acid group, and n is preferably 2.

In the ink, the content of the compound represented by General Formula (I) is preferably specified by the concentration of a sulfonyl group because a preferred range varies depending on molecular weights. Specifically, the concentration (mmol/kg) of the sulfonyl group derived from the compound represented by General Formula (I) in the ink is preferably 0.03 mmol/kg or more to 4.00 mmol/kg or less. If the concentration of the sulfonyl group derived from the compound represented by General Formula (I) is less than 0.03 mmol/kg, the effect of reducing the occurrence of kogation may be slightly reduced. If the concentration of the sulfonyl group derived from the compound represented by General Formula (I) is more than 4.00 mmol/kg, the compound represented by General Formula (I) itself may be likely to generate kogation, and the effect of reducing the occurrence of kogation may be slightly reduced. Incidentally, the compound represented by General Formula (I) has one sulfonyl group per one molecule. Therefore, the concentration (mmol/kg) of the sulfonyl group derived from the compound represented by General Formula (I) in the ink is the same as the concentration (mmol/kg) of the compound represented by General Formula (I) in the ink.

The compound represented by General Formula (I) can be synthesized by a usual method. For example, a compound corresponding to the benzene ring substituted with $R_1$, a benzenesulfinic acid compound optionally substituted with an alkyl group, and, as needed, an alkali agent such as potassium hydroxide are mixed in a liquid medium such as water. The dehydration reaction is then allowed to proceed while the mixture was stirred under heating, as needed. Subsequently, the product is purified and isolated by an appropriate technique such as liquid chromatography, giving the compound represented by General Formula (I) as the target compound. The compound represented by General Formula (I) is not limited the compound synthesized by the above method, and a commercially available compound can also be used.

Another Salt, Water-Soluble Organic Solvent Having Dielectric Constant of 32 or Less The aqueous ink may contain (i) a salt other than the compound represented by General Formula (I) (hereinafter also called "another salt") or (ii) a water-soluble organic solvent having a dielectric constant of 32 or less. When containing another salt, the ink has a higher ion concentration, and thus the self-dispersible pigment forms loose aggregates. A water-soluble organic solvent having a low dielectric constant exhibits an action of reducing the ionic dissociation of the anionic group of a self-dispersible pigment. The ink contains water, and thus the self-dispersible pigment does not aggregate but forms loose aggregates. When another salt or a water-soluble organic solvent having a dielectric constant of 32 or less is contained in the ink, the self-dispersible pigment consequently has a smaller apparent surface area. This improves the action by the compound represented by General Formula (I) to reduce the heat denaturation or oxidation of a self-dispersible pigment, and the occurrence of kogation can be reduced more effectively. In addition, the said another salt or the water-soluble organic solvent having a dielectric constant of 32 or less has an advantage of further improving the optical density of an image to be recorded and thus is preferably used.

Another Salt

Said another salt can be exemplified by those constituted by combining such a cation and an anion as exemplified below. The cation is at least one cation selected from the group consisting of an alkali metal ion, an ammonium ion, and an organic ammonium ion. The anion is at least one anion selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$, and $H_2PO_4^-$.

Examples of the alkali metal ion include a lithium ion, a sodium ion, and a potassium ion. Examples of the organic ammonium ion include cations of alkylamines having a carbon number of 1 or more to 3 or less, such as methylamine and ethylamine; and cations of alkanolamines having a carbon number of 1 or more to 4 or less, such as monoethanolamine, diethanolamine, and triethanolamine.

Examples of the salt constituted by combining a cation and an anion include $(M_2)Cl$, $(M_2)Br$, $(M_2)I$, $(M_2)ClO$, $(M_2)ClO_2$, $(M_2)ClO_3$, $(M_2)ClO_4$, $(M_2)NO_2$, $(M_2)NO_3$, $(M_2)_2SO_4$, $(M_2)_2CO_3$, $(M_2)HCO_3$, $HCOO(M_2)$, $(COO(M_2))_2$, $COOH(COO(M_2))$, $CH_3COO(M_2)$, $C_2H_4(COO(M_2))_2$, $C_6H_5COO(M_2)$, $C_6H_4(COO(M_2))_2$, $(M_2)_3PO_4$, $(M_2)_2HPO_4$, and $(M_2)H_2PO_4$, where $(M_2)$ is a monovalent cation. Of them, sodium acetate, sodium benzoate, potassium benzoate, ammonium benzoate, trisodium citrate, potassium phthalate, and ammonium phthalate are preferred, for example.

In the ink, the concentration (mmol/kg) of said another salt is preferably 2.00 mmol/kg or more to 100.00 mmol/kg or less and more preferably 5.00 mmol/kg or more to 20.00 mmol/kg or less based on the total mass of the ink. Other than said another salt, intermolecular salts such as amino acids, taurine, and betaine compounds can be used.

Water-soluble organic solvent having dielectric constant of 32 or less

In the aqueous ink, the content (% by mass) of the water-soluble organic solvent having a dielectric constant of 32 or less is preferably 0.50% by mass or more to 20.00% by mass or less and more preferably 2.00% by mass or more to 8.00% by mass or less based on the total mass of the ink.

The dielectric constants of water-soluble organic solvents and water can be determined by using a dielectric constant meter (for example, trade name "BI-870", manufactured by BROOKHAVEN INSTRUMENTS CORPORATION) at a frequency of 10 kHz. The dielectric constant of a water-soluble organic solvent that is solid at a temperature of 25° C. can be determined by measuring the dielectric constant of a 50% by mass aqueous solution and calculating the objective dielectric constant in accordance with equation (A) below. Although "water-soluble organic solvent" typically means a liquid, a solvent that is solid at 25° C. (normal temperature) is also included in the water-soluble organic solvent in the present invention.

$$\varepsilon_{sol} = 2\varepsilon_{50\%} - \varepsilon_{water} \quad (A)$$

$\varepsilon_{sol}$: dielectric constant of a water-soluble organic solvent solid at 25° C.
$\varepsilon_{50\%}$: dielectric constant of a 50% by mass aqueous solution of the water-soluble organic solvent solid at 25° C.
$\varepsilon_{water}$: dielectric constant of water Specific examples of the water-soluble organic solvent that is generally used in aqueous inks and is solid at 25° C. include 1,6-hexanediol, trimethylolpropane, ethylene urea, urea, and polyethylene glycol having a number average molecular weight of 1,000.

The reason why the dielectric constant of a water-soluble organic solvent solid at 25° C. is calculated from the dielectric constant of a 50% by mass aqueous solution is as follows: Some of the water-soluble organic solvents that are solid at 25° C. and usable as a component of an aqueous ink are difficult to give an aqueous solution having a high concentration of more than 50% by mass. Meanwhile, the dielectric constant of an aqueous solution having a low concentration of 10% by mass or less is dominated by the dielectric constant of water. It is thus difficult to determine the probable (practical) dielectric constant value of such a water-soluble organic solvent. Hence, the inventors of the present invention have studied and found that most of the water-soluble organic solvents that are solid at 25° C. and usable in inks can give a measurable aqueous solution and the calculated dielectric constants which are consistent with the advantageous effects of the invention. For the above reason, the dielectric constant of a water-soluble organic solvent solid at 25° C. is intended to be calculated from the dielectric constant of a 50% by mass aqueous solution in the present invention. For a water-soluble organic solvent that is solid at 25° C. but has a low solubility in water and cannot give a 50% by mass aqueous solution, an aqueous solution at saturated concentration is used, and the dielectric constant is calculated in accordance with the above calculation of $\varepsilon_{sol}$ and is used expediently.

Specific examples of the water-soluble organic solvent having a dielectric constant of 32 or less include N-methyl-2-pyrrolidone (32), triethanolamine (32), diethylene glycol (32), 1,4-butanediol (31), 1,3-butanediol (30), 1,2-propanediol (29), 1,2,6-hexanetriol (29), 2-methyl-1,3-propanediol (28), 2-pyrrolidone (28), 1,5-pentanediol (27), 3-methyl-1,3-butanediol (24), 3-methyl-1,5-pentanediol (24), ethanol (24), 1-(hydroxymethyl)-5,5-dimethylhydantoin (24), triethylene glycol (23), tetraethylene glycol (21), polyethylene glycol having a number average molecular weight of 200 (19), 2-ethyl-1,3-hexanediol (19), isopropanol (18), 1,2-hexanediol (15), n-propanol (12), polyethylene glycol having a number average molecular weight of 600 (11), triethylene glycol monobutyl ether (10), tetraethylene glycol monobutyl ether (9), 1,6-hexanediol (7), and polyethylene glycol having a number average molecular weight of 1,000 (5) (the values in parentheses are dielectric constants at 25° C.). The water-soluble organic solvent having a dielectric constant of 32 or less preferably has a lower vapor pressure than that of water, at 25° C.

A water-soluble organic solvent having a lower dielectric constant is likely to affect the dispersion state of a self-dispersible pigment, depending on the molecular structure thereof. On this account, for example, when a water-soluble organic solvent that has a dielectric constant of 10 or less and is liquid at normal temperature is used, the content (% by mass) is preferably 0.50% by mass or less and more preferably 0.10% by mass or less based on the total mass of the ink. Specifically, it is particularly preferred not to use a water-soluble organic solvent that has a dielectric constant of 10 or less and is liquid at normal temperature. The water-soluble organic solvent that has a dielectric constant of 10 or less and is liquid at normal temperature is exemplified by glycol ethers.

Aqueous Medium

The aqueous ink can contain an aqueous medium that is a mixed solvent of water and a water-soluble organic solvent. As the water, deionized water or ion-exchanged water is preferably used. In the aqueous ink, the content (% by mass) of water is preferably 50.00% by mass or more to 95.00% by mass or less based on the total mass of the ink.

The water-soluble organic solvent may be any water-soluble solvent, and can be an alcohol, a polyhydric alcohol, a polyglycol, a glycol ether, a nitrogen-containing polar solvent, or a sulfur-containing polar solvent, for example. In the ink, the content (% by mass) of the water-soluble organic solvent (including the water-soluble organic solvent having a dielectric constant of 32 or less) is preferably 5.00% by mass or more to 90.00% by mass or less based on the total mass of the ink. The content is more preferably 10.00% by mass or more to 50.00% by mass or less.

Specific examples of the water-soluble organic solvent (including specific examples of the water-soluble organic solvent having a dielectric constant of 32 or less) include monohydric alcohols having 1 to 4 carbon atoms, such as methanol (33), ethanol (24), n-propanol (12), isopropanol (18), n-butanol, sec-butanol, and tert-butanol; dihydric alcohols such as 1,2-propanediol (29), 1,3-butanediol (30), 1,4-butanediol (31), 1,5-pentanediol (27), 1,2-hexanediol (15), 1,6-hexanediol (7), 2-methyl-1,3-propanediol (28), 3-methyl-1,3-butanediol (24), 3-methyl-1,5-pentanediol (24), and 2-ethyl-1,3-hexanediol (19); polyhydric alcohols such as 1,2,6-hexanetriol (29), glycerol (42), trimethylolpropane (34), and trimethylolethane; alkylene glycols such as ethylene glycol (40), diethylene glycol (32), triethylene glycol (23), tetraethylene glycol (21), butylene glycol, hexylene glycol, and thiodiglycol; glycol ethers such as diethylene glycol monomethyl ether, diethylene glycol monoethyl ether, triethylene glycol monoethyl ether, triethylene glycol monobutyl ether (10), and tetraethylene glycol monobutyl ether (9); polyalkylene glycols having a number average molecular weight of 200 to 1,000, such as polyethylene glycol having a number average molecular weight of 200 (19), polyethylene glycol having a number average molecular weight of 600 (11), polyethylene glycol having a number average molecular weight of 1,000 (5), and polypropylene glycol; nitrogen-containing compounds such as 2-pyrrolidone (28), N-methyl-2-pyrrolidone (32), 1-(2-hydroxyethyl)-2-pyrrolidone (38), 1,3-dimethyl-2-imidazolidinone, N-methylmorpholine, urea (110), ethylene urea (50), triethanolamine (32), and 1-hydroxymethyl-5,5-dimethylhydantoin (24); sulfur-containing compounds such as dimethyl sulfoxide (49) and bis(2-hydroxyethyl sulfone); and cyclic ethers such as γ-butyrolactone (42) (the values in parentheses are dielectric constants at 25° C.). The water-soluble organic solvent preferably has a dielectric constant of 3 or more. The water-soluble organic solvent preferably has a lower vapor pressure than that of water, at 25° C.

Resin

The aqueous ink can contain a resin. The resin can be added to the ink for the purpose of (i) further stabilizing the dispersion state of the self-dispersible pigment and (ii) improving the abrasion resistance of images to be recorded, for example. In the ink, the content (% by mass) of the resin is preferably 0.10% by mass or more to 10.00% by mass or less and more preferably 1.00% by mass or more to 5.00% by mass or less based on the total mass of the ink.

As the resin, a resin having an anionic group is preferred. Specific examples of the resin include acrylic resins, polyester resins, urethane resins, urea resins, polysaccharides, and polypeptides. Of them, acrylic resins and urethane resins are preferred because the ejection stability of the ink is readily achieved. The structure of the resin is exemplified by a block copolymer, a random copolymer, a graft copolymer, and combinations of them.

The resin in the aqueous ink may be in a dissolved state in an aqueous medium or in a dispersed state as resin particles in an aqueous medium. In the present invention, the water-soluble resin is a resin that does not form such particles that the particle diameter thereof can be determined by dynamic light scattering when the resin is neutralized with an equivalent amount of an alkali to the acid value. The resin preferably has an acid value of 30 mg KOH/g or more to 350 mg KOH/g or less. The resin preferably has a weight average molecular weight (weight average molecular weight determined by gel permeation chromatography in terms of polystyrene) of 1,000 or more to 100,000 or less and more preferably 5,000 or more to 50,000 or less.

Dye

The aqueous ink can further contain a dye as a coloring material for toning and the like in addition to the self-dispersible pigment. The dye is not limited to particular types. Specific examples of the dye include direct dyes, acid dyes, basic dyes, disperse dyes, and food dyes, and a dye having an anionic group is preferably used. Specific examples of the dye skeleton include azo, triphenylmethane, phthalocyanine, azaphthalocyanine, xanthene, and anthrapyridone. A dye having a hue common to the self-dispersible pigment is preferably used, where the hue is classified into black, cyan, magenta, yellow, red, blue, and green. In the ink, the content (% by mass) of the dye is preferably 0.20% by mass or more to 8.00% by mass or less and more preferably 0.50% by mass or more to 3.00% by mass or less based on the total mass of the ink.

Other Additives

The ink of the present invention can contain various additives such as a surfactant, a pH adjuster, an anticorrosive, an antiseptic agent, an antifungal agent, an evaporation accelerator, an antioxidant, a reduction inhibitor, an evaporation accelerator, and a chelating agent, as needed.

Examples of the surfactant include anionic, cationic, and nonionic surfactants. In the ink, the content (% by mass) of the surfactant is preferably 0.10% by mass or more to 5.00% by mass or less and more preferably 0.10% by mass or more to 2.00% by mass or less based on the total mass of the ink.

As the surfactant, a nonionic surfactant such as polyoxyethylene alkyl ethers, polyoxyethylene fatty acid esters, polyoxyethylene alkyl phenyl ethers, polyoxyethylene/polyoxypropylene block copolymers, and acetylene glycol compounds is preferably used. The hydrophobic group of the surfactant is likely to be adsorbed to the particle surface of a self-dispersible pigment. Hence, the dispersion state of the self-dispersible pigment in the ink can be stably maintained. This is because the nonionic surfactant amongst the surfactants has no ionic group and thus is unlikely to interact with the functional group of the self-dispersible pigment but is likely to be adsorbed to the pigment particle surface. When an ionic surfactant is used, the content (% by mass) thereof is preferably 0.10% by mass or less and more preferably 0.05% by mass or less based on the total mass of the ink. Specifically, it is particularly preferred not to use the ionic surfactant.

Physical Properties of Ink

The aqueous ink of the present invention is an ink applied to an ink jet system. Hence, the physical property values thereof are preferably controlled to appropriate values. Specifically, the ink preferably has a surface tension of 10 mN/m or more to 60 mN/m or less and more preferably 20 mN/m or more to 60 mN/m or less at 25° C. More specifically, the surface tension is preferably 30 mN/m or more to 50 mN/m or less and particularly preferably 30 mN/m or more to 40 mN/m or less. The ink preferably has a viscosity of 1.0 mPa·s or more to 10.0 mPa·s or less, more preferably 1.0 mPa·s or more to 5.0 mPa·s or less, and particularly preferably 1.0 mPa·s or more to 3.0 mPa·s or less at 25° C. The ink preferably has a pH of 5.0 or more to 10.0 or less at 25° C. Specifically, the pH is preferably 6.0 or more to 8.5 or less. When the pH is within this range, the dispersion stability of the self-dispersible pigment is improved and the solubility of the compound represented by General Formula (I) is ensured. Hence, the ink obtains excellent storage stability.

Reaction Liquid

The aqueous ink of the present invention can be used in combination with a reaction liquid. The reaction liquid causes a self-dispersible pigment to aggregate when coming into contact with an ink, and contains a reactant. Examples of the reactant include a cationic component such as a polyvalent metal ion and a cationic resin, and an organic acid.

Examples of the polyvalent metal ion include divalent metal ions such as $Ca^{2+}$, $Cu^{2+}$, $Ni^{2+}$, $Mg^{2+}$, $Zn^{2+}$, $Sr^{2+}$, and $Ba^{2+}$; and trivalent metal ions such as $Al^{3+}$, $Fe^{3+}$, $Cr^{3+}$, and $Y^{3+}$. To add a polyvalent metal ion to the reaction liquid, a polyvalent metal salt (which can be a hydrate) constituted by combining a polyvalent metal ion with an anion can be used. Examples of the anion include inorganic anions such as $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $PO_4^{3-}$, $HPO_4^{2-}$, and $H_2PO_4^-$; and organic anions such as $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, and $CH_3SO_3^-$. When a polyvalent metal ion is used as the reactant, the content (% by mass) in terms of polyvalent metal salt in the reaction liquid is preferably 1.00% by mass or more to 10.00% by mass or less based on the total mass of the reaction liquid.

Examples of the cationic resin include a resin having a primary to tertiary amine structure and a resin having a quaternary ammonium salt structure. Specific examples include resins having a structure such as vinylamine, allylamine, vinylimidazole, vinylpyridine, dimethylaminoethyl methacrylate, ethyleneimine, and guanidine. In order to improve the solubility in the reaction liquid, the cationic resin may be used in combination with an acidic compound, or the cationic resin may be subjected to quaternarization treatment. When a cationic resin is used as the reactant, the content (% by mass) of the cationic resin in the reaction liquid is preferably 1.00% by mass or more to 10.00% by mass or less based on the total mass of the reaction liquid.

The reaction liquid containing an organic acid has a buffer capacity in an acidic region (less than pH 7.0, preferably pH 2.0 to pH 5.0), thus makes the anionic group of the self-dispersible pigment in an ink be in an acid form, and causes the self-dispersible pigment to aggregate. Examples of the organic acid include a monocarboxylic acid such as formic acid, acetic acid, propionic acid, and butyric acid and salts thereof; a dicarboxylic acid such as phthalic acid, isophthalic acid, terephthalic acid, oxalic acid, malonic acid, succinic acid, glutaric acid, adipic acid, maleic acid, fumaric acid, itaconic acid, sebacic acid, dimer acid, and pyromellitic acid and salts and hydrogen salts thereof; a tricarboxylic acid such as citric acid and trimellitic acid and salts and hydrogen salts thereof; and a hydroxycarboxylic acid such as oxysuccinic acid, DL-malic acid, and tartaric acid and salts thereof. Examples of the cation forming a salt include an alkali metal ion such as a lithium ion, a sodium ion, and a potassium ion; an ammonium ion; and an organic ammonium ion. In the reaction liquid, the content (% by mass) of the organic acid is preferably 1.00% by mass or more to 40.00% by mass or less based on the total mass of the reaction liquid.

In addition to the reactant, the reaction liquid can contain water, a water-soluble organic solvent, other additives, and the like that are substantially the same as those exemplified above as the components usable in the aqueous ink.

Clear Ink

The aqueous ink of the present invention can also be used in combination with a clear ink containing no coloring material. The clear ink is applied onto the image recorded with an ink containing a coloring material. The clear ink is used in order to improve properties (glossiness, abrasion resistance, and the like) of the image recorded with an ink containing a coloring material, for example. The clear ink contains no coloring material but can contain water, a water-soluble organic solvent, other additives, and the like that are substantially the same as those exemplified above as the components usable in the aqueous ink.

Ink Cartridge

The ink cartridge of the present invention includes an ink and an ink storage portion that stores the ink. The ink stored in the ink storage portion is the above-described ink of the present invention. FIG. 1 is a schematic sectional view illustrating an embodiment of the ink cartridge of the present invention. As shown in FIG. 1, the bottom face of the ink cartridge has an ink supply port 12 for supplying the ink to a recording head. The inside of the ink cartridge is an ink storage portion for storing the ink. The ink storage portion includes an ink storage chamber 14 and an absorber storage chamber 16, and the ink storage chamber 14 and the absorber storage chamber 16 communicate with each other through a communication hole 18. The absorber storage chamber 16 communicates with the ink supply port 12. The ink storage chamber 14 stores a liquid ink 20. The absorber storage chamber 16 stores absorbers 22 and 24 that are impregnated with the ink to hold the ink. The ink storage portion does not necessarily have the ink storage chamber that stores a liquid ink, and can be a portion in which all the ink stored is held by absorbers. The ink storage portion does not necessarily have absorbers, and can be a portion that stores all the ink in a liquid state. The ink storage portion may be integrated with a recording head to form an ink cartridge.

Ink Jet Recording Method

The ink jet recording method of the present invention is a method in which the above-described ink of the present invention is ejected from an ink jet recording head by the action of thermal energy to record an image on a recording medium. The ink jet recording method can include known steps except that the ink of the present invention is used.

Figure 2A:
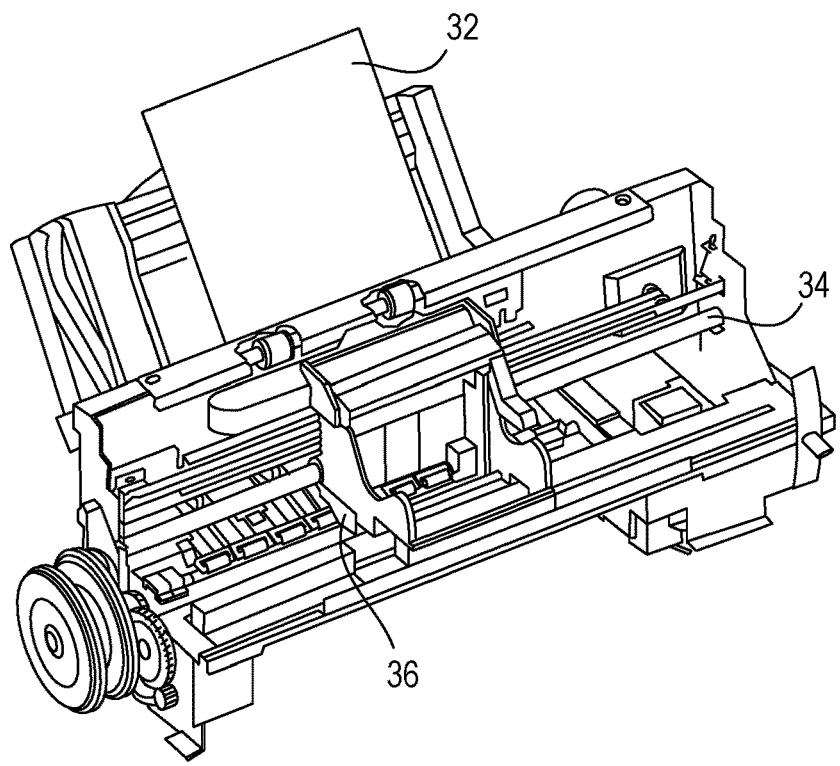
FIGS. 2A and 2B are schematic views illustrating an exemplary ink jet recording apparatus used for an ink jet recording method of the present invention.
Figure 2B:
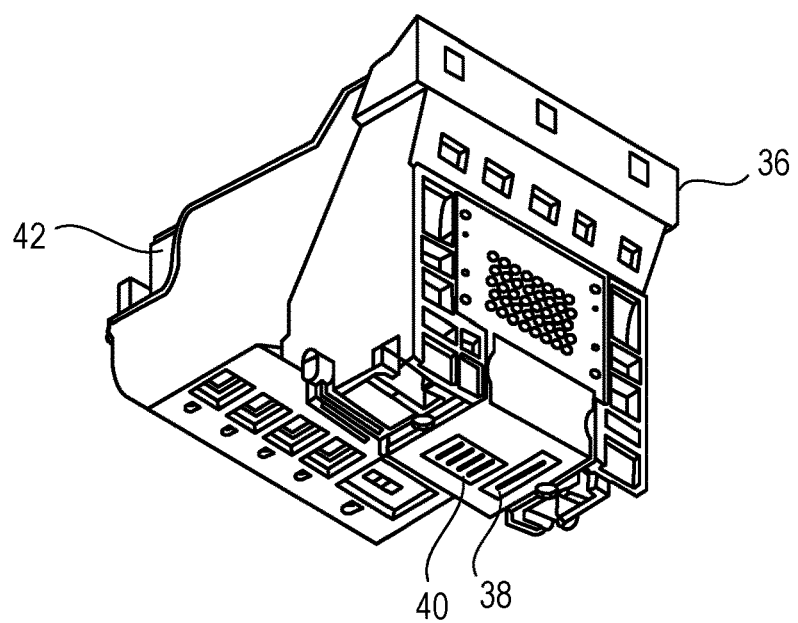

FIGS. 2A and 2B are schematic views illustrating an exemplary ink jet recording apparatus used for the ink jet recording method of the present invention; FIG. 2A is a perspective view of a principal part of the ink jet recording apparatus; and FIG. 2B is a perspective view of a head cartridge. The ink jet recording apparatus includes a conveyance unit (not illustrated) for conveying a recording medium 32 and a carriage shaft 34. On the carriage shaft 34, a head cartridge 36 can be set. The head cartridge 36 includes recording heads 38 and 40 and is so constructed that an ink cartridge 42 is set. Inks (not illustrated) are ejected toward the recording medium 32 from the recording heads 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32

EXAMPLES

The present invention will next be described in further detail with reference to examples and comparative examples, but the invention is not intended to be limited to the following examples without departing from the scope of the invention. The component amounts with "part" or "%" are based on mass unless otherwise noted.

Preparation of Pigment Dispersion Liquid (Measurement Method of Surface Charge Amount of Self-Dispersible Pigment)

An automatic potential-difference titrator (trade name "AT-510", manufactured by Kyoto Electronics Manufacturing) equipped with a stream potential titration unit (PCD-500) was used to determine the surface charge amount of the self-dispersible pigment in a pigment dispersion liquid by potentiometric titration using methyl glycol chitosan as the titrant.

Pigment Dispersion Liquid 1

A solution prepared by dissolving 5.0 g of concentrated hydrochloric acid in 5.5 g of water was cooled to 5° C., and 1.6 g of 4-aminophthalic acid (treatment agent) was added to the solution. The container containing the solution was placed in an ice bath, and to the solution being stirred to maintain the temperature at 10° C. or less, a solution prepared by dissolving 1.8 g of sodium nitrite in 9.0 g of ion-exchanged water at 5° C. was added. After stirring for 15 minutes, 6.0 g of a pigment (carbon black, trade name "NIPex 170IQ", manufactured by Orion Engineered Carbons, a BET specific surface area of 200 $m^2/g$, a DBP oil absorption amount of 135 mL/100 g) was added under stirring, and the whole was further stirred for 15 minutes, giving a slurry. The obtained slurry was filtered through a filter paper (trade name "Standard filter paper No. 2", manufactured by ADVANTEC), and the particles were thoroughly washed with water and dried in an oven at 110° C. Sodium ions as the counter ions were replaced with potassium ions by an ion exchange method, and then an appropriate amount of ion-exchanged water was added to adjust the pigment content, giving a pigment dispersion liquid 1 having a pigment content of 15.0%. The self-dispersible pigment in the pigment dispersion liquid 1 had a surface charge amount of 0.340 mmol/g.

Pigment Dispersion Liquid 2

A solution prepared by dissolving 5.0 g of concentrated hydrochloric acid in 5.5 g of water was cooled to 5° C., and 1.6 g of 4-aminophthalic acid (treatment agent) was added to the solution. The container containing the solution was placed in an ice bath, and to the solution being stirred to maintain the temperature at 10° C. or less, a solution prepared by dissolving 1.8 g of sodium nitrite in 9.0 g of ion-exchanged water at 5° C. was added. After stirring for 15 minutes, 6.0 g of a pigment (carbon black, trade name "NIPex 170IQ", manufactured by Orion Engineered Carbons, a BET specific surface area of 200 $m^2/g$, a DBP oil absorption amount of 135 mL/100 g) was added under stirring, and the whole was further stirred for 15 minutes, giving a slurry. An 8 mol/L aqueous solution of potassium hydroxide was then added to adjust the liquid pH to 10, giving a dispersion liquid. An ultrafiltration apparatus (trade name "RP-2100" manufactured by Eyela) and a filter (a pencil-shaped module "SAP-0013", manufactured by Asahi Kasei Chemicals) were used to remove impurities from the dispersion liquid for purification. The purification was performed by the following procedure: The dispersion liquid was concentrated to 20 mL with the ultrafiltration apparatus (180 mL of filtrate was removed); then 180 mL of ion-exchanged water was added to dilute the dispersion liquid; this operation was repeated 4 times; and the filtrate was confirmed to have an electrical conductivity of 50 μS/cm or less. Sodium ions as the counter ions were replaced with ammonium ions by an ion exchange method. After the ion exchange, the liquid was centrifuged at a rotation speed of 5,000 rpm for 30 minutes to remove coarse particles, and then an appropriate amount of ion-exchanged water was added to adjust the pigment content, giving a pigment dispersion liquid 2 having a pigment content of 15.0%. The self-dispersible pigment in the pigment dispersion liquid 2 had a surface charge amount of 0.340 mmol/g.

Pigment Dispersion Liquid 3

A pigment dispersion liquid 3 having a pigment content of 15.0% was prepared in the same manner as in the preparation of the pigment dispersion liquid 1 except that the pigment was changed to C.I. Pigment Blue 15:3 (trade name "Heliogen Blue D7079", manufactured by BASF). The self-dispersible pigment in the pigment dispersion liquid 3 had a surface charge amount of 0.190 mmol/g.

Pigment Dispersion Liquid 4

In a vessel with a volume of 400 mL (manufactured by Aimex), 18.0 g of a pigment, 180 g of ion-exchanged water, and 1.0 mmol/g of a treatment agent (relative to the amount of the pigment) were put and mixed. As the pigment, carbon black (trade name "NIPex 170IQ", manufactured by Orion Engineered Carbons, a BET specific surface area of 200 $m^2/g$, a DBP oil absorption amount of 135 mL/100 g) was used. As the treatment agent, 4-(2-tert-butoxycarbonylhydrazino)phthalic acid (manufactured by Sumika Technoservice) was used. This treatment agent is a compound represented by General Formula (1) in which $R_1$ and $R_3$ are a hydrogen atom, $R_2$ is a tert-butyl carboxylate group, and $A_1$ is a 3,4-dicarboxyphenyl group. An 8 mol/L aqueous solution of potassium hydroxide was added to adjust the liquid pH to 3, and then the liquid was stirred at 25° C. at a rotation speed of 2,000 rpm for 12 hours. An 8 mol/L aqueous solution of potassium hydroxide was then added to adjust the liquid pH to 10, giving a dispersion liquid. An ultrafiltration apparatus (trade name "RP-2100" manufactured by Eyela) and a filter (a pencil-shaped module "SAP-0013", manufactured by Asahi Kasei Chemicals) were used to remove impurities from the dispersion liquid for purification. The purification was performed by the following procedure: The dispersion liquid was concentrated to 20 mL with the ultrafiltration apparatus (180 mL of filtrate was removed); then 180 mL of ion-exchanged water was added to dilute the dispersion liquid; this operation was repeated 4 times; and the filtrate was confirmed to have an electrical conductivity of 50 µS/cm or less. After the purification, the liquid was centrifuged at a rotation speed of 5,000 rpm for 30 minutes to remove coarse particles, giving a pigment dispersion liquid 4 having a pigment content of 10.0%. The self-dispersible pigment in the pigment dispersion liquid 4 had a surface charge amount of 0.260 mmol/g.

Pigment Dispersion Liquid 5

As materials, 4-aminophthalic acid (manufactured by Tokyo Chemical Industry Co., Ltd.) and p-benzenesulfonyl chloride (manufactured by Tokyo Chemical Industry Co., Ltd.) were prepared. The p-benzenesulfonyl chloride was twice as much as the amount of the 4-aminophthalic acid (molar ratio). These prepared materials were used to obtain 4-(1,2-bisphenylsulfonylhydrazino)phthalic acid in accordance with the description in WO 2001/002351. This compound is a compound represented by General Formula (1) in which $R_1$ is a hydrogen atom, $R_2$ and $R_3$ are a phenylsulfonyl group, and $A_1$ is a 3,4-dicarboxyphenyl group. The same procedure as for the pigment dispersion liquid 4 was performed except that the treatment agent was changed to 4-(1,2-bisphenylsulfonylhydrazino)phthalic acid, giving a pigment dispersion liquid 5 having a pigment content of 15.0%. The self-dispersible pigment in the pigment dispersion liquid 5 had a surface charge amount of 0.250 mmol/g.

Pigment Dispersion Liquid 6

A pigment dispersion liquid 6 having a pigment content of 15.0% was prepared in the same manner as for the pigment dispersion liquid 4 except that the treatment agent was changed to acetone 3,4-dicarboxyphenylhydrazone (manufactured by WDB Functional Chemistry). This treatment agent is a compound represented by General Formula (2) in which $R_5$ and $R_6$ are each a methyl group, $R_7$ is a hydrogen atom, and $A_2$ is a 3,4-dicarboxyphenyl group. The self-dispersible pigment in the pigment dispersion liquid 6 had a surface charge amount of 0.240 mmol/g.

Pigment Dispersion Liquid 7

A pigment dispersion liquid 7 having a pigment content of 15.0% was prepared in the same manner as for the pigment dispersion liquid 4 except that the reatment agent was changed to 4-(phenylsulfonylazo)phthalic acid (manufactured by WDB Functional Chemistry). This treatment agent is a compound represented by General Formula (3) in which $R_8$ is a phenylsulfonyl group and $A_3$ is a 3,4-dicarboxyphenyl group. The self-dispersible pigment in the pigment dispersion liquid 7 had a surface charge amount of 0.250 mmol/g.

Pigment Dispersion Liquid 8

With reference to the description of "Example 3" in Japanese Patent Application Laid-Open No. 2003-535949, the particle surface of a pigment was oxidized with ozone gas to prepare a self-dispersible pigment. Specifically, the pigment was first, preliminary dispersed in ion-exchanged water and then was treated with ozone for 6 hours. As the pigment, carbon black (trade name "NIPex 170IQ", manufactured by Orion Engineered Carbons, a BET specific surface area of 200 $m^2$/g, a DBP oil absorption amount of 135 mL/100 g) was used. Next, while potassium hydroxide was added to adjust the pH of the mixture to about 7, the mixture was circulated for 3 hours with a liquid-liquid collision type disperser. An appropriate amount of ion-exchanged water was added to adjust the pigment content, giving a pigment dispersion liquid 8 having a pigment content of 10.0%. The self-dispersible pigment in the pigment dispersion liquid 8 had a surface charge amount of 0.320 mmol/g.

Pigment Dispersion Liquid 9

A commercially available pigment dispersion liquid (trade name "BONJET BLACK CW-1", manufactured by Orient Chemical Industries) containing a self-dispersible pigment produced by oxidation of the particle surface of a pigment (carbon black) with an oxidant was used as a pigment dispersion liquid 9. The pigment dispersion liquid 9 had a pigment content of 20.0%, and the self-dispersible pigment had a surface charge amount of 0.330 mmol/g.

Pigment Dispersion Liquid 10

A commercially available pigment dispersion liquid (trade name "Aqua-Black 162", manufactured by Tokai Carbon) containing a self-dispersible pigment produced by oxidation of the particle surface of a pigment (carbon black) with an oxidant was used as a pigment dispersion liquid 10. The pigment dispersion liquid 10 had a pigment content of 19.0%, and the self-dispersible pigment had a surface charge amount of 0.320 mmol/g.

Pigment Dispersion Liquid 11

A solution prepared by dissolving 5.0 g of concentrated hydrochloric acid in 5.5 g of water was cooled to 5° C., and 0.16 g of 4-aminophthalic acid (treatment agent) was added to the solution. The container containing the solution was placed in an ice bath, and to the solution being stirred to maintain the temperature at 10° C. or less, a solution prepared by dissolving 0.18 g of sodium nitrite in 9.0 g of ion-exchanged water at 5° C. was added. After stirring for 15 minutes, 6.0 g of a pigment (carbon black, trade name "NIPex 170IQ", manufactured by Orion Engineered Carbons, a BET specific surface area of 200 $m^2$/g, a DBP oil absorption amount of 135 mL/100 g) was added under stirring, and the whole was further stirred for 2 minutes. An aqueous solution of potassium hydroxide was added to quench the diazonium compound generated by the reaction of the treatment agent with sodium nitrite. After that, the same procedure as for the pigment dispersion liquid 1 was performed, giving a pigment dispersion liquid 11 having a pigment content of 15.0%. The self-dispersible pigment in the pigment dispersion liquid 11 had a surface charge amount of 0.020 mmol/g.

Pigment Dispersion Liquid 12

A pigment dispersion liquid 12 having a pigment content of 15.0% was prepared in the same manner as for the pigment dispersion liquid 11 except that the stirring time after the addition of the pigment was 2 minutes. The self-dispersible pigment in the pigment dispersion liquid 12 had a surface charge amount of 0.025 mmol/g.

Pigment Dispersion Liquid 13

Before the drying in an oven, the same procedure as for the pigment dispersion liquid 1 was performed except that 2.0 g of 5-amino-1,2,3-benzenetricarboxylic acid was used as the treatment agent. Then, 2.0 g of 5-amino-1,2,3-benzenetricarboxylic acid was used to repeat the same treatment. The treatment was repeated 4 times, and then the same procedure as for the pigment dispersion liquid 1 was performed, giving a pigment dispersion liquid 13 having a pigment content of 15.0%. The self-dispersible pigment in the pigment dispersion liquid 13 had a surface charge amount of 1.000 mmol/g.

Pigment Dispersion Liquid 14

A pigment dispersion liquid 14 having a pigment content of 15.0% was prepared in the same manner as for the pigment dispersion liquid 13 except that the treatment with the treatment agent was repeated 8 times. The self-dispersible pigment in the pigment dispersion liquid 14 had a surface charge amount of 1.050 mmol/g.

Pigment Dispersion Liquid 15

First, 20.0 parts of a pigment, 8.0 parts of an acrylic resin (trade name "Joncryl 683", manufactured by BASF, an acid value of 160 mg KOH/g), 1.0 part of potassium hydroxide, and 71.0 parts of ion-exchanged water were mixed to give a mixture. As the pigment, carbon black (trade name "NIPex 170IQ", manufactured by Orion Engineered Carbons, a BET specific surface area of 200 $m^2$/g, a DBP oil absorption amount of 135 mL/100 g) was used. The obtained mixture was placed in a paint shaker together with glass beads and dispersed for 8 hours. The resulting mixture was subjected to centrifugal separation to remove coarse particles, then the resin that had not been adsorbed to the pigment was removed by ultrafiltration, and ion-exchanged water was added. The resulting liquid was subjected to pressure filtration through a microfilter with a pore size of 3.0 μm (manufactured by Fujifilm), and then an aqueous solution of potassium hydroxide was used to adjust the pH. An appropriate amount of ion-exchanged water was added to adjust the pigment content, giving a pigment dispersion liquid 15 having a pigment content of 15.0% and an acrylic resin content of 6.0%. The pigment dispersed by the resin in the pigment dispersion liquid 15 had a surface charge amount of 0.39 mmol/g.

Pigment Dispersion Liquid 16

First, 20.0 parts of a pigment, 4.0 parts of sodium naphthalene sulfonate formaldehyde condensate (trade name "DEMOL N", manufactured by Kao), and 76.0 parts of ion-exchanged water were mixed to give a mixture. The same procedure as for the pigment dispersion liquid 15 was performed except that the above mixture was used, giving a pigment dispersion liquid 16 having a pigment content of 15.0% and a sodium naphthalene sulfonate formaldehyde condensate content of 3.0%. The pigment dispersed by the dispersant in the pigment dispersion liquid 16 had a surface charge amount of 0.33 mmol/g. The surface charge amount was calculated by conversion of the elementary analysis value of sulfur.

Preparation of Resin Aqueous Solution

In a beaker with a volume of 200 mL, 10.0 parts of an acrylic resin (trade name "Joncryl 683", manufactured by BASF), 1.0 part of potassium hydroxide, and 70.0 parts of ion-exchanged water were placed and stirred at 50° C. for 2 hours, and the resin was dissolved. The solution was subjected to pressure filtration through a microfilter with a pore size of 0.2 μm (manufactured by Fujifilm), and then an aqueous solution of potassium hydroxide was added to adjust the pH. An appropriate amount of ion-exchanged water was further added, giving a resin aqueous solution having an acrylic resin content of 10.0%.

Preparation of Ink

The components (unit: %) shown in the upper part in Table 2 were mixed and thoroughly stirred, and the mixture was subjected to pressure filtration through a membrane filter with a pore size of 2.5 μm (trade name "HDCII Filter", manufactured by Pall), giving the corresponding ink. The amount of ion-exchanged water was such a residual amount that the total amount of the components is 100.00%. In Table 2, "Acetylenol E100" is the trade name of a nonionic surfactant (ethylene oxide adduct of acetylene glycol) manufactured by Kawaken Fine Chemicals. The numerical values in the parentheses suffixed to water-soluble organic solvents are the dielectric constants of the corresponding water-soluble organic solvents. The structures of the compounds A to I in Table 2 are shown below. In the lower part in Table 2, the content (%) of a compound represented by General Formula (I) and the concentration A (mmol/kg) of a sulfonyl group are shown.

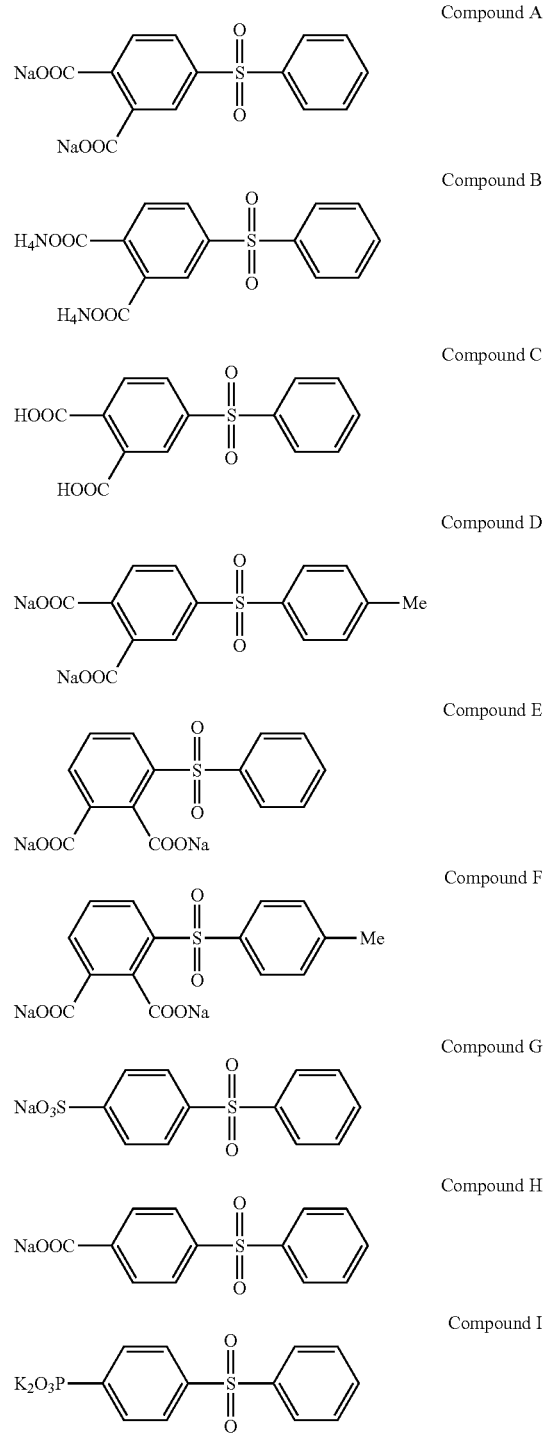

TABLE 2

Compositions and properties of inks

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Pigment dispersion liquid 1 | 20.00 | | | | | | | 20.00 | 20.00 | 20.00 | 20.00 | 20.00 | 20.00 |
| Pigment dispersion liquid 2 | | 20.00 | | | | | | | | | | | |
| Pigment dispersion liquid 3 | | | 20.00 | | | | | | | | | | |
| Pigment dispersion liquid 4 | | | | 30.00 | | | | | | | | | |
| Pigment dispersion liquid 5 | | | | | 30.00 | | | | | | | | |
| Pigment dispersion liquid 6 | | | | | | 30.00 | | | | | | | |
| Pigment dispersion liquid 7 | | | | | | | 30.00 | | | | | | |
| Pigment dispersion liquid 8 | | | | | | | | | | | | | |
| Pigment dispersion liquid 9 | | | | | | | | | | | | | |
| Pigment dispersion liquid 10 | | | | | | | | | | | | | |
| Pigment dispersion liquid 11 | | | | | | | | | | | | | |
| Pigment dispersion liquid 12 | | | | | | | | | | | | | |
| Pigment dispersion liquid 13 | | | | | | | | | | | | | |
| Pigment dispersion liquid 14 | | | | | | | | | | | | | |
| Pigment dispersion liquid 15 | | | | | | | | | | | | | |
| Pigment dispersion liquid 16 | | | | | | | | | | | | | |
| C.I. Direct Blue 199 | | | | | | | | | 0.30 | | | | |
| C.I. Acid Black 1 | | | | | | | | | | | | | |
| Compound A | 0.0035 | 0.0035 | 0.0035 | 0.0035 | 0.0035 | 0.0035 | 0.0035 | 0.0035 | 0.0035 | | | | |
| Compound B | | | | | | | | | | 0.0035 | | | |
| Compound C | | | | | | | | | | | 0.0032 | | |
| Compound D | | | | | | | | | | | | 0.0036 | |
| Compound E | | | | | | | | | | | | | 0.0035 |
| Compound F | | | | | | | | | | | | | |
| Compound G | | | | | | | | | | | | | |
| Compound H | | | | | | | | | | | | | |
| Compound I | | | | | | | | | | | | | |
| Bis(2-hydroxyethyl) sulfone | | | | | | | | | | | | | |
| Ethyl isopropyl sulfone | | | | | | | | | | | | | |
| Diphenyl sulfone | | | | | | | | | | | | | |
| Ammonium phthalate | 0.20 | 0.20 | 0.20 | 0.20 | 0.20 | 0.20 | 0.20 | 0.20 | 0.20 | 0.20 | 0.20 | 0.20 | 0.20 |
| Potassium sulfate | | | | | | | | | | | | | |
| Glycerol (42) | 12.00 | 12.00 | 12.00 | 12.00 | 12.00 | 12.00 | 12.00 | 12.00 | 12.00 | 12.00 | 12.00 | 12.00 | 12.00 |
| Trimethylolpropane (34) | | | | | | | | | | | | | |
| Diethylene glycol (32) | | | | | | | | | | | | | |
| 2-Pyrrolidone (28) | 2.00 | 2.00 | 2.00 | 2.00 | 2.00 | 2.00 | 2.00 | 2.00 | 2.00 | 2.00 | 2.00 | 2.00 | 2.00 |
| Triethylene glycol (23) | 5.00 | 5.00 | 5.00 | 5.00 | 5.00 | 5.00 | 5.00 | 5.00 | 5.00 | 5.00 | 5.00 | 5.00 | 5.00 |
| 1,2-Hexanediol (15) | 1.00 | 1.00 | 1.00 | 1.00 | 1.00 | 1.00 | 1.00 | 1.00 | 1.00 | 1.00 | 1.00 | 1.00 | 1.00 |
| Resin aqueous solution | | | | | | | | | 15.00 | | | | |
| Acetylenol E100 | 0.15 | 0.15 | 0.15 | 0.15 | 0.15 | 0.15 | 0.15 | 0.15 | 0.15 | 0.15 | 0.15 | 0.15 | 0.15 |
| Ion-exchanged water | Balance | Balance | Balance | Balance | Balance | Balance | Balance | Balance | Balance | Balance | Balance | Balance | Balance |
| Sulfonyl group concentration A (mmol/kg) | 0.10 | 0.10 | 0.10 | 0.10 | 0.10 | 0.10 | 0.10 | 0.10 | 0.10 | 0.10 | 0.10 | 0.10 | 0.10 |

TABLE 2-continued

Compositions and properties of inks

| | Example 14 | 15 | 16 | 17 | 18 | 19 | 20 | 21 | 22 | 23 | 24 | 25 | 26 |
|---|---|---|---|---|---|---|---|---|---|---|---|---|---|
| Pigment dispersion liquid 1 | 20.00 | 20.00 | 20.00 | 20.00 | 20.00 | 20.00 | | | | | | | |
| Pigment dispersion liquid 2 | | | | | | | | | | | | | |
| Pigment dispersion liquid 3 | | | | | | | | | | | | | |
| Pigment dispersion liquid 4 | | | | | | | | | | | | | |
| Pigment dispersion liquid 5 | | | | | | | | | | | | | |
| Pigment dispersion liquid 6 | | | | | | | | | | | | | |
| Pigment dispersion liquid 7 | | | | | | | | | | | | | |
| Pigment dispersion liquid 8 | | | | | | | | 30.00 | | | | | |
| Pigment dispersion liquid 9 | | | | | | | | | 15.00 | | | | |
| Pigment dispersion liquid 10 | | | | | | | | | | 15.79 | | | |
| Pigment dispersion liquid 11 | | | | | | | | | | | 20.00 | | |
| Pigment dispersion liquid 12 | | | | | | | | | | | | 20.00 | |
| Pigment dispersion liquid 13 | | | | | | | | | | | | | 20.00 |
| Pigment dispersion liquid 14 | | | | | | | | | | | | | 20.00 |
| Pigment dispersion liquid 15 | | | | | | | | | | | | | |
| Pigment dispersion liquid 16 | | | | | | | | | | | | | |
| C.I. Direct Blue 199 | | | | | | | | | | | | | |
| C.I. Acid Black 1 | | | | | | | | | | | | | |
| Compound A | | | | | 0.0018 | | 0.0035 | 0.0035 | 0.0035 | 0.0035 | 0.0035 | 0.0035 | 0.0035 |
| Compound B | | | | | | | | | | | | | |
| Compound C | | | | | | | | | | | | | |
| Compound D | | | | | | 0.0018 | | | | | | | |
| Compound E | | | | | 0.0018 | | | | | | | | |
| Compound F | 0.0036 | | | | | 0.0018 | | | | | | | |
| Compound G | | 0.0032 | | | | | | | | | | | |
| Compound H | | | 0.0028 | | | | | | | | | | |
| Compound I | | | | 0.0037 | | | | | | | | | |
| Bis(2-hydroxyethyl) sulfone | | | | | | | | | | | | | |
| Ethyl isopropyl sulfone | | | | | | | | | | | | | |
| Diphenyl sulfone | | | | | | | | | | | | | |
| Ammonium phthalate | 0.20 | 0.20 | 0.20 | 0.20 | 0.20 | 0.20 | 0.20 | 0.20 | 0.20 | 0.20 | 0.20 | 0.20 | 0.20 |
| Potassium sulfate | | | | | | | | | | | | | |
| Glycerol (42) | 12.00 | 12.00 | 12.00 | 12.00 | 12.00 | 12.00 | 12.00 | 12.00 | 12.00 | 12.00 | 12.00 | 12.00 | 12.00 |
| Trimethylolpropane (34) | | | | | | | | | | | | | |
| Diethylene glycol (32) | | | | | | | | | | | | | |
| 2-Pyrrolidone (28) | 2.00 | 2.00 | 2.00 | 2.00 | 2.00 | 2.00 | 2.00 | 2.00 | 2.00 | 2.00 | 2.00 | 2.00 | 2.00 |
| Triethylene glycol (23) | 5.00 | 5.00 | 5.00 | 5.00 | 5.00 | 5.00 | 5.00 | 5.00 | 5.00 | 5.00 | 5.00 | 5.00 | 5.00 |
| 1,2-Hexanediol (15) | 1.00 | 1.00 | 1.00 | 1.00 | 1.00 | 1.00 | 1.00 | 1.00 | 1.00 | 1.00 | 1.00 | 1.00 | 1.00 |
| Resin aqueous solution | | | | | | | | | | | | | |
| Acetylenol E100 | 0.15 | 0.15 | 0.15 | 0.15 | 0.15 | 0.15 | 0.15 | 0.15 | 0.15 | 0.15 | 0.15 | 0.15 | 0.15 |
| Ion-exchanged water | Balance | Balance | Balance | Balance | Balance | Balance | Balance | Balance | Balance | Balance | Balance | Balance | Balance |
| Sulfonyl group concentration A (mmol/kg) | 0.10 | 0.10 | 0.10 | 0.10 | 0.10 | 0.10 | 0.10 | 0.10 | 0.10 | 0.10 | 0.10 | 0.10 | 0.10 |

TABLE 2-continued

Compositions and properties of inks

| | Example | | | | | | | | | | | | |
|---|---|---|---|---|---|---|---|---|---|---|---|---|---|
| | 27 | 28 | 29 | 30 | 31 | 32 | 33 | 34 | 35 | 36 | 37 | 38 | 39 |
| Pigment dispersion liquid 1 | 20.00 | 20.00 | 20.00 | 20.00 | 20.00 | 20.00 | 20.00 | 20.00 | 20.00 | 20.00 | 20.00 | 20.00 | 20.00 |
| Pigment dispersion liquid 2 | | | | | | | | | | | | | |
| Pigment dispersion liquid 3 | | | | | | | | | | | | | |
| Pigment dispersion liquid 4 | | | | | | | | | | | | | |
| Pigment dispersion liquid 5 | | | | | | | | | | | | | |
| Pigment dispersion liquid 6 | | | | | | | | | | | | | |
| Pigment dispersion liquid 7 | | | | | | | | | | | | | |
| Pigment dispersion liquid 8 | | | | | | | | | | | | | |
| Pigment dispersion liquid 9 | | | | | | | | | | | | | |
| Pigment dispersion liquid 10 | | | | | | | | | | | | | |
| Pigment dispersion liquid 11 | | | | | | | | | | | | | |
| Pigment dispersion liquid 12 | | | | | | | | | | | | | |
| Pigment dispersion liquid 13 | | | | | | | | | | | | | |
| Pigment dispersion liquid 14 | | | | | | | | | | | | | |
| Pigment dispersion liquid 15 | | | | | | | | | | | | | |
| Pigment dispersion liquid 16 | | | | | | | | | | | | | |
| C.I. Direct Blue 199 | | | | | | | | | | | | | |
| C.I. Acid Black 1 | | | | | | | | | | | | | |
| Compound A | 0.0004 | 0.0011 | 0.1401 | 0.2172 | 0.0035 | 0.0035 | 0.0035 | 0.0035 | 0.0035 | 0.0035 | 0.0035 | 0.0035 | 0.0035 |
| Compound B | | | | | | | | | | | | | |
| Compound C | | | | | | | | | | | | | |
| Compound D | | | | | | | | | | | | | |
| Compound E | | | | | | | | | | | | | |
| Compound F | | | | | | | | | | | | | |
| Compound G | | | | | | | | | | | | | |
| Compound H | | | | | | | | | | | | | |
| Compound I | | | | | | | | | | | | | |
| Bis(2-hydroxyethyl) sulfone | | | | | | | | | | | | | |
| Ethyl isopropyl sulfone | | | | | | | | | | | | | |
| Diphenyl sulfone | | | | | | | | | | | | | |
| Ammonium phthalate | 0.20 | 0.20 | 0.20 | 0.20 | | | 0.20 | 0.20 | 0.20 | 0.20 | 0.20 | 0.20 | |
| Potassium sulfate | | | | | | 0.16 | | | | | | | |
| Glycerol (42) | 12.00 | 12.00 | 12.00 | 12.00 | 12.00 | 12.00 | 20.00 | | | | | | 12.00 |
| Trimethylol-propane (34) | | | | | | | | 20.00 | | | | | 8.00 |
| Diethylene glycol (32) | | | | | | | | | | 20.00 | | | |
| 2-Pyrrolidone (28) | 2.00 | 2.00 | 2.00 | 2.00 | 2.00 | 2.00 | | | 20.00 | | | | |
| Triethylene glycol (23) | 5.00 | 5.00 | 5.00 | 5.00 | 5.00 | 5.00 | | | | | 20.00 | 15.00 | |
| 1,2-Hexanediol (15) | 1.00 | 1.00 | 1.00 | 1.00 | 1.00 | 1.00 | | | | | | 5.00 | |
| Resin aqueous solution | | | | | | | | | | | | | |
| Acetylenol E100 | 0.15 | 0.15 | 0.15 | 0.15 | 0.15 | 0.15 | 0.15 | 0.15 | 0.15 | 0.15 | 0.15 | 0.15 | 0.15 |
| Ion-exchanged water | Balance | Balance | Balance | Balance | Balance | Balance | Balance | Balance | Balance | Balance | Balance | Balance | Balance |
| Sulfonyl group concentration A (mmol/kg) | 0.01 | 0.03 | 4.00 | 6.20 | 0.10 | 0.10 | 0.10 | 0.10 | 0.10 | 0.10 | 0.10 | 0.10 | 0.10 |

TABLE 2-continued

| Compositions and properties of inks | Example | Reference Example | | | | Comparative Example | | | | | | | |
|---|---|---|---|---|---|---|---|---|---|---|---|---|---|
| | 40 | 1 | 2 | 3 | 4 | 1 | 2 | 3 | 4 | 5 | 6 | 7 | 8 |
| Pigment dispersion liquid 1 | | | | 20.00 | 20.00 | 20.00 | 20.00 | 20.00 | 20.00 | 20.00 | | | |
| Pigment dispersion liquid 2 | | | | | | | | | | | | | |
| Pigment dispersion liquid 3 | | | | | | | | | | | | | 20.00 |
| Pigment dispersion liquid 4 | | | | | | | | | | | | | |
| Pigment dispersion liquid 5 | | | | | | | | | | | | | |
| Pigment dispersion liquid 6 | | | | | | | | | | | | | |
| Pigment dispersion liquid 7 | | | | | | | | | | | | | |
| Pigment dispersion liquid 8 | 20.00 | | | | | | | | | | | | |
| Pigment dispersion liquid 9 | | | | | | | | | | | | | |
| Pigment dispersion liquid 10 | | | | | | | | | | | | | |
| Pigment dispersion liquid 11 | | | | | | | | | | | | | |
| Pigment dispersion liquid 12 | | | | | | | | | | | | | |
| Pigment dispersion liquid 13 | | | | | | | | | | | | | |
| Pigment dispersion liquid 14 | | | | | | | | | | | | | |
| Pigment dispersion liquid 15 | | 20.00 | 20.00 | | | | | | | | | | |
| Pigment dispersion liquid 16 | | | | | | | | | | | 20.00 | 20.00 | |
| C.I. Direct Blue 199 | | | | | | | | | | | | | |
| C.I. Acid Black 1 | | | | | | | | | | 0.30 | 0.30 | 0.30 | |
| Compound A | 0.0004 | 0.0035 | | 0.0035 | | | | | | | | | |
| Compound B | | | | | | | | | | | | | |
| Compound C | | | | | | | | | | | | | |
| Compound D | | | | | | | | | | | | | |
| Compound E | | | | | | | | | | | | | |
| Compound F | | | | | | | | | | | | | |
| Compound G | | | | | | | | | | | | | |
| Compound H | | | | | | | | | | | | | |
| Compound I | | | | | | | | | | | | | |
| Bis(2-hydroxyethyl) sulfone | | | | | | | | 0.0035 | | | | | |
| Ethyl isopropyl sulfone | | | | | | | | | 0.0035 | | | | |
| Diphenyl sulfone | | | | | | | | | | 0.0035 | | | |
| Ammonium phthalate | | 0.20 | 0.20 | 0.20 | 0.20 | 0.20 | 0.20 | 0.20 | 0.20 | 0.20 | 0.20 | 0.20 | 0.20 |
| Potassium sulfate | | | | | | | | | | | | | |
| Glycerol (42) | 20.00 | 12.00 | 12.00 | 12.00 | 12.00 | 12.00 | 12.00 | 12.00 | 12.00 | 12.00 | 12.00 | 12.00 | 12.00 |
| Trimethylol-propane (34) | | | | | | | | | | | | | |
| Diethylene glycol (32) | | | | | | | | | | | | | |
| 2-Pyrrolidone (28) | | 2.00 | 2.00 | 2.00 | 2.00 | 2.00 | 2.00 | 2.00 | 2.00 | 2.00 | 2.00 | 2.00 | 2.00 |
| Triethylene glycol (23) | | 5.00 | 5.00 | 5.00 | 5.00 | 5.00 | 5.00 | 5.00 | 5.00 | 5.00 | 5.00 | 5.00 | 5.00 |
| 1,2-Hexanediol (15) | | 1.00 | 1.00 | 1.00 | 1.00 | 1.00 | 1.00 | 1.00 | 1.00 | 1.00 | 1.00 | 1.00 | 1.00 |
| Resin aqueous solution | | | | | | | | | | | | | |
| Acetylenol E100 | 0.15 | 0.15 | 0.15 | 0.15 | 0.15 | 0.15 | 0.15 | 0.15 | 0.15 | 0.15 | 0.15 | 0.15 | 0.15 |
| Ion-exchanged water | Balance | Balance | Balance | Balance | Balance | Balance | Balance | Balance | Balance | Balance | Balance | Balance | Balance |
| Sulfonyl group concentration A (mmol/kg) | 0.01 | 0.10 | 0.00 | 0.10 | 0.00 | 0.00 | 0.00 | 0.00 | 0.00 | 0.00 | 0.00 | 0.00 | 0.00 |

Evaluation

Reduction of Kogation

Each ink obtained above was filled in an ink cartridge, and the ink cartridge was set at the position for a mat black in an ink jet recording apparatus (trade name "PIXUS iP4830", manufactured by Canon) equipped with a recording head that ejects an ink by thermal energy. Only for Reference Examples 3 and 4, the recording head was replaced by a piezoelectric type. Next, $4 \times 10^7$ droplets of the ink were ejected from one ejection orifice of the recording head. Then, the heater portion of the recording head was observed under an optical microscope to examine the generation state of kogation. In the present invention, the amount of kogation was relatively evaluated into four grades, "AA", "A", "B", and "C". A sample evaluated as "AA", "A", or "B" was regarded as an acceptable level, and a sample evaluated as "C" was regarded as an unacceptable level. The evaluation results are shown in Table 3.

Optical Density

Each ink obtained above was filled in an ink cartridge, and the ink cartridge was set in an ink jet recording apparatus (trade name "PIXUS MP480", manufactured by Canon) equipped with a recording head that ejects an ink by thermal energy. In the examples, a solid image recorded under conditions where an ink having a weight of 25 ng±10% is applied to a unit area of 1/600 inch×1/600 inch is defined as "a recording duty of 100%". A solid image (2 cm×2 cm/line) having a recording duty of 100% was recorded on a recording medium (plain paper, trade name "Canon Plain Paper, White SW-101", manufactured by Canon). One day after the recording, a reflection densitometer (trade name "Macbeth RD-918", manufactured by Macbeth) was used to determine the optical density of the solid image, and the optical density of the image was evaluated based on the following criteria. In the present invention, a sample evaluated as "A" or "B" was regarded as an acceptable level, and a sample evaluated as "C" was regarded as an unacceptable level. The evaluation results are shown in Table 3.

A: the optical density was 1.50 or more.
B: the optical density was not less than 1.40 and less than 1.50.
C: the optical density was less than 1.40.

TABLE 3

| | | Evaluation results | |
|---|---|---|---|
| | | Reduction of kogation | Optical density |
| Example | 1 | AA | A |
| | 2 | AA | A |
| | 3 | AA | B |
| | 4 | AA | A |
| | 5 | AA | A |
| | 6 | AA | A |
| | 7 | AA | A |
| | 8 | AA | A |
| | 9 | AA | A |
| | 10 | AA | A |
| | 11 | AA | A |
| | 12 | AA | A |
| | 13 | AA | A |
| | 14 | AA | A |
| | 15 | AA | A |
| | 16 | AA | A |
| | 17 | AA | A |
| | 18 | AA | A |
| | 19 | AA | A |
| | 20 | AA | B |
| | 21 | AA | B |
| | 22 | AA | B |
| | 23 | B | A |
| | 24 | AA | A |
| | 25 | AA | A |
| | 26 | B | A |
| | 27 | A | A |
| | 28 | AA | A |
| | 29 | AA | A |
| | 30 | A | A |
| | 31 | AA | A |
| | 32 | AA | A |
| | 33 | AA | A |
| | 34 | AA | A |
| | 35 | AA | A |
| | 36 | AA | A |
| | 37 | AA | A |
| | 38 | AA | A |
| | 39 | AA | B |
| | 40 | B | B |
| Reference Example | 1 | AA | C |
| | 2 | AA | C |
| | 3 | AA | A |
| | 4 | AA | A |
| Comparative Example | 1 | C | A |
| | 2 | C | A |
| | 3 | C | A |
| | 4 | C | A |
| | 5 | C | A |
| | 6 | AA | C |
| | 7 | AA | C |
| | 8 | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-255629, filed Dec. 28, 2015, which is hereby incorporated by reference herein in its entirety.

What is claimed is:

1. An aqueous ink for use in an ink jet recording method using a recording head that ejects an ink by an action of thermal energy, the aqueous ink comprising:

a self-dispersible pigment; and a compound represented by General Formula (I):

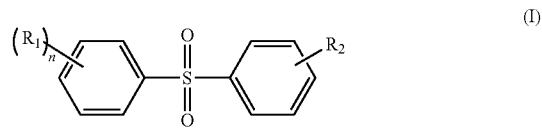

wherein, in General Formula (I), n is an integer of 1 to 5, such that (i) when n is 1, $R_1$ is a sulfonic acid group, a carboxylic acid group, a phosphoric acid group or a phosphonic acid group, and (ii) when n is 2 to 5, $R_1$'s are independently of each other, a sulfonic acid group, a carboxylic acid group, a phosphoric acid group or a phosphonic acid group, and $R_2$ is a hydrogen atom or an alkyl group.

2. The aqueous ink according to claim 1, wherein the self-dispersible pigment comprises a self-dispersible pigment having an anionic group that is bonded to a particle surface of the pigment through another atomic group.

3. The aqueous ink according to claim 1, wherein a surface charge amount (mmol/g) of the self-dispersible pigment is 0.025 mmol/g or more to 1.000 mmol/g or less.

4. The aqueous ink according to claim 1, wherein a concentration (mmol/kg) of a sulfonyl group derived from the compound represented by General Formula (I) is 0.03 mmol/kg or more to 4.00 mmol/kg or less.

5. The aqueous ink according to claim 1, wherein a pigment species of the self-dispersible pigment is carbon black.

6. The aqueous ink according to claim 1, further comprising at least one component of (i) a salt constituted by combining at least one cation selected from the group consisting of an alkali metal ion, an ammonium ion, and an organic ammonium ion with at least one anion selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$, and $H_2PO_4^-$ and (ii) a water-soluble organic solvent having a dielectric constant of 32 or less.

7. An ink cartridge comprising:
an ink; and
an ink storage portion that stores the ink,
wherein the ink comprises the aqueous ink according to claim 1.

8. An ink jet recording method comprising:
ejecting an ink from an ink jet recording head by an action of thermal energy to record an image on a recording medium,
wherein the ink comprises the aqueous ink according to claim 1.

9. The aqueous ink according to claim 1, wherein the content (% by mass) of the self-dispersible pigment is 0.10% by mass or more to 15.00% by mass or less based on the total mass of the ink.

10. The aqueous ink according to claim 2, wherein the anionic group comprises a carboxylic acid group.

11. The aqueous ink according to claim 1, wherein the self-dispersible pigment comprises a self-dispersible pigment having a phthalic acid group bonded to a particle surface of the pigment.

12. The aqueous ink according to claim 1, wherein $R_1$ in the compound represented by General Formula (I) is a carboxylic acid group.

* * * * *